United States Patent [19]

Kawamoto

[11] Patent Number: 5,365,254
[45] Date of Patent: Nov. 15, 1994

[54] TRENDGRAPH DISPLAY SYSTEM

[75] Inventor: Junichi Kawamoto, Tokyo, Japan

[73] Assignee: Kabushiki Kaisha Toshiba, Kanagawa, Japan

[21] Appl. No.: 19,339

[22] Filed: Feb. 18, 1993

Related U.S. Application Data

[63] Continuation of Ser. No. 672,403, Mar. 20, 1991, abandoned.

[30] Foreign Application Priority Data

Mar. 23, 1990 [JP] Japan .................. 2-072014

[51] Int. Cl.$^5$ .............................. G09G 3/02
[52] U.S. Cl. .................. 345/157; 345/131; 345/134
[58] Field of Search .............. 340/712, 709, 706, 721, 340/722, 731; 324/121 R; 178/18, 19; 345/157, 156, 160, 161, 162, 163, 168, 172, 173, 184

[56] References Cited

U.S. PATENT DOCUMENTS

| | | | |
|---|---|---|---|
| 4,121,204 | 10/1978 | Welch et al. | 340/712 |
| 4,307,393 | 12/1981 | Hamada et al. | 340/722 |
| 4,310,839 | 1/1982 | Schwendt | 340/712 |
| 4,386,347 | 5/1983 | Cutler | 340/712 |
| 4,751,504 | 6/1988 | Slavin | 340/722 |
| 4,755,811 | 7/1988 | Slavin | 340/721 |
| 4,847,785 | 7/1989 | Stephens | 340/722 |

*Primary Examiner*—Ulysses Weldon
*Assistant Examiner*—Xiao M. Wu
*Attorney, Agent, or Firm*—Finnegan, Henderson, Farabow, Garrett & Dunner

[57] ABSTRACT

A trendgraph display system for displaying a trendgraph with the X axis being the time axis, representing time-serially data collected at a specified period in a display area. The system includes a cursor unit for displaying a cursorline movable in the direction of the X axis in the display area, a touch sensor unit for specifying by a touch a point on the X axis to which the cursorline is to be moved, a unit for moving the cursorline to the specified point, a unit for detecting a point of intersection where the cursorline intersects the displayed trendgraph in the display area, a unit for selecting a display scale and a scale alteration direction of the displayed trendgraph and a display control unit for displaying the trendgraph with the point of intersection at the center of the display area at the selected alteration direction at the selected display scale.

4 Claims, 5 Drawing Sheets

TRENDGRAPH DISPLAY SYSTEM

This application is a continuation of application Ser. No. 07/672,403 filed Mar. 20, 1991, now abandoned.

BACKGROUND OF THE INVENTION

This invention relates to a system for displaying a trendgraph representing time-serially data collected, and more particularly to a trendgraph display system capable of enlarging or reducing trendgraphs.

In the prior art, the monitoring of various plants and the utilities such as fife warning networks in office buildings, water supplies and tunnel equipment has involved data collected from the monitoring area at fixed intervals being rendered as a trend graph. A trend graph shows the trends of the monitored phenomena over time so that, for example, if a fault occurs in the equipment being monitored, it is possible to obtain information about the cause of this fault from the trend graph and greater detail can be obtained by enlarging the trend graph. A trend graph scale alteration device controls the display of a trend graph.

In conventional trend graph scale alteration devices, as shown in FIG. 1, a trend graph is displayed in a display area 11 of a CRT screen at monitoring periods set by the operator's key-board. A movable cursor 12 displays a cursorline 12A on axis X, which is the time axis, in display area 11 of the trend graph. This movable cursor 12 is moved along axis X by the cursor movement keys. After the cursor 12 is moved, the graph information of part A at the intersection of the trend graph and the cursorline 12A of cursor 12 is displayed in a data display close to display area 11. If there is an input specifying an enlargement rate, the trend graph is displayed in enlarged form, with median line L1 at its center, in display area 11, as shown in FIG.2.

However, in such conventional trend graph scale alteration devices, since cursor 12 is moved manually using the cursor moving keys, the speed at which the cursor can be moved is limited and the time taken to move the cursor significantly inhibits improvement of operating efficiency. Moreover, when the trend graph is enlarged, the position of the cursor 12 is reset to a corner in display area 11 and the graph information displayed in the data display area is deleted.

Also as the trend graph is enlarged with median line L1 of axis Y at its centre, the necessary part of the graph is enlarged vertically and it may be impossible to inspect the adjoining sections of the graph or to display this within display area 11. When, as a result of the enlargement, the desired area cannot be displayed in display area 11, the display window must be scrolled along axis Y using the screen scroll key and cursor 12 is moved to this part, which is an extremely complex operation for the operator to perform.

Thus, conventional trend graph scale alteration devices require considerable time for cursor movement. And, when the trend graph is enlarged, the operations to render the required part of the trend graph susceptible to monitoring are complex. They thus have poor operating characteristics.

SUMMARY OF THE INVENTION

It is an object of this invention to improve the controllability of displaying a trendgraph.

Another object is to make it possible to improve the operability of altering graph scale of the specified part of a trendgraph.

Additional objects and advantages will be obvious from the description which follows, or may be learned by the practice of the invention.

The foregoing objects are achieved according to the present invention by providing a trendgraph display system for displaying a trendgraph with the X axis being the time axis, representing time-serially data collected at a specified period in a display area. The system includes cursor means for displaying a cursorline movable in the direction of the X axis in the display area, touch sensor means for specifying by a touch a point on the X axis to which the cursorline to be moved, means for moving the cursorline to the specified point, means for detecting a point of intersection where the cursorline intersects the displayed trendgraph, means for selecting a display scale and a scale alteration direction of the displayed trendgraph,and display control means for displaying the trendgraph with the point of intersection in the center of the display area at the selected alteration direction at the selected display scale.

DETAILED DESCRIPTION OF THE PREFERRED EMBODIMENT

The following is an explanation of an embodiment of this invention with reference to drawings.

Figure 1:
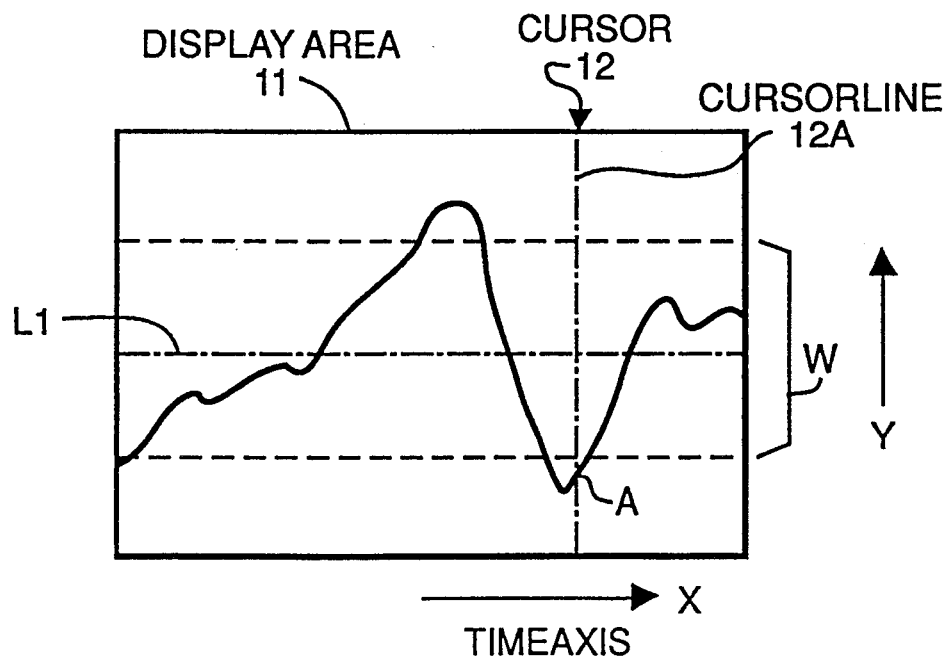
FIGS. 1 and 2 are views illustrating enlarged trendgraph displayed by a conventional trendgraph display system.
Figure 2:
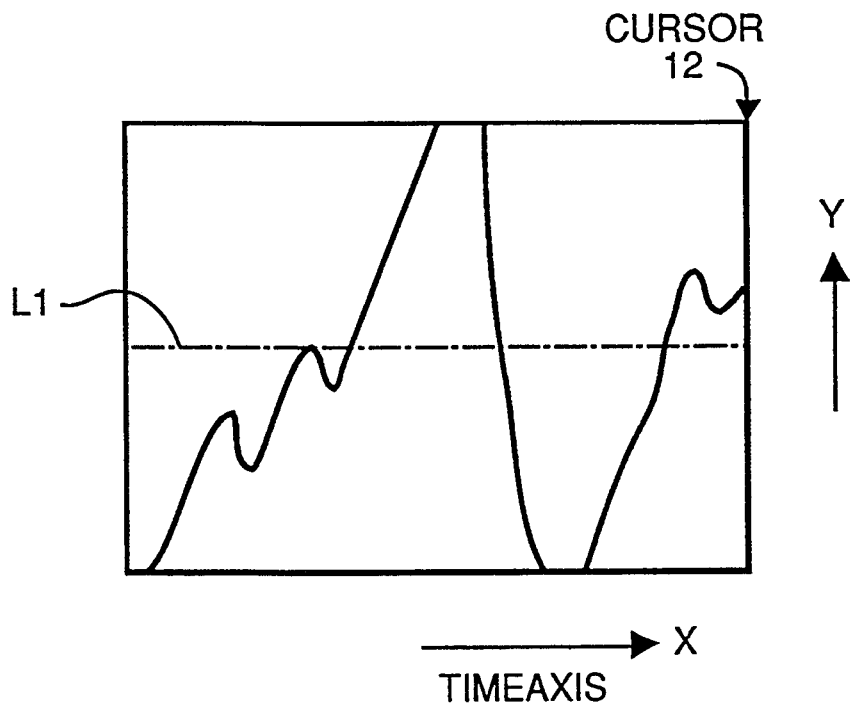
Figure 3:
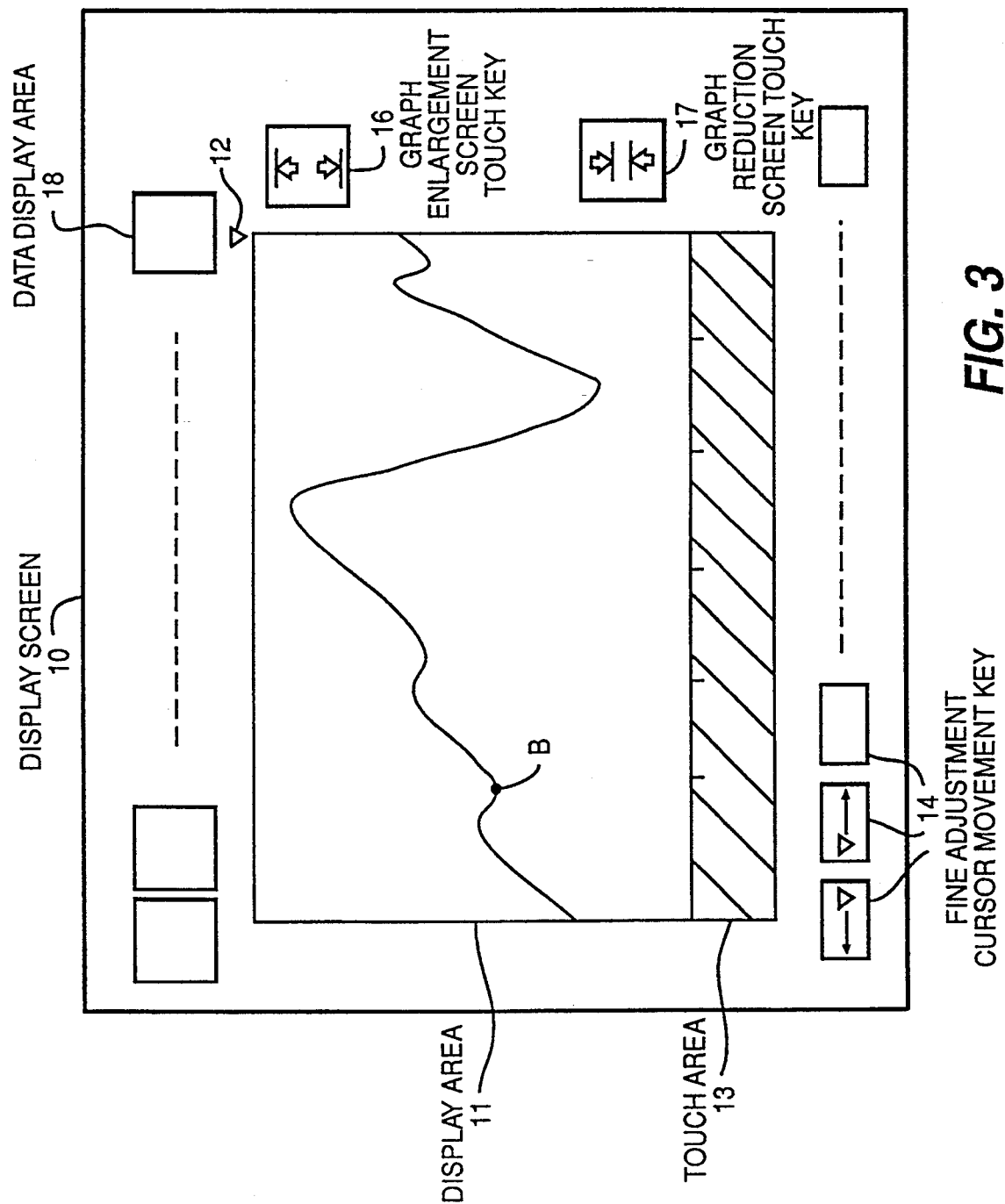
FIG. 3 is a view showing a display screen which is a part of an embodiment of the invention.

FIG. 3 shows an external view of a trend graph scale alteration device in one embodiment of the invention and shows the display and control operations of this. In FIG. 3 a CRT display screen 10 with a size of 768 dots (vertical) ×1024 dots (horizontal) is provided. Within this display screen 10, there is a graph display area 11 with a size of 400 dots (vertical) ×720 dots (horizontal). This graph display area 11 displays the trend graph with a horizontal axis (axis X) of time. Along axis X, at the bottom edge of graph display area 11 in display screen 10, there is a touch area 13 and the X coordinate of the touched position is detected by the touch sensors which are provided in touch area 13. Touch area 13 consists of 15 touch zones along axis X. Each of these touch zones corresponds in size to a human finger and is 48 dots × 48 dots in size, with a resolution of 16×16 dots. Therefore, as will be described later, the minimum unit of movement of the cursor 12 when touch area 13 is used is 48 dots. The date and time data relevant to the trend graph displayed are displayed in touch area 13 at specified distances. Initially, cursor 12 is displayed at the top of the display area 11 and is capable of moving along axis X. This cursor 12 can be moved to a touch zone by touching touch area 13 and then moved by one dot units using the fine adjustment cursor movement key 14, one of the soft-touch keys which are provided along the bottom edge of display area 11. Graph enlargement screen touch key (henceforth knowns as "the enlargement key") 16 and graph reduction screen touch key 17 are provided on the right edge of display screen 10 as means of inputting scale alteration specifications. There are also multiple data display area 18 along axis X at the top of the graphs display area 11. These data display areas 18 display information relating to the part of the trend graph specified by cursor 12.

Figure 4:
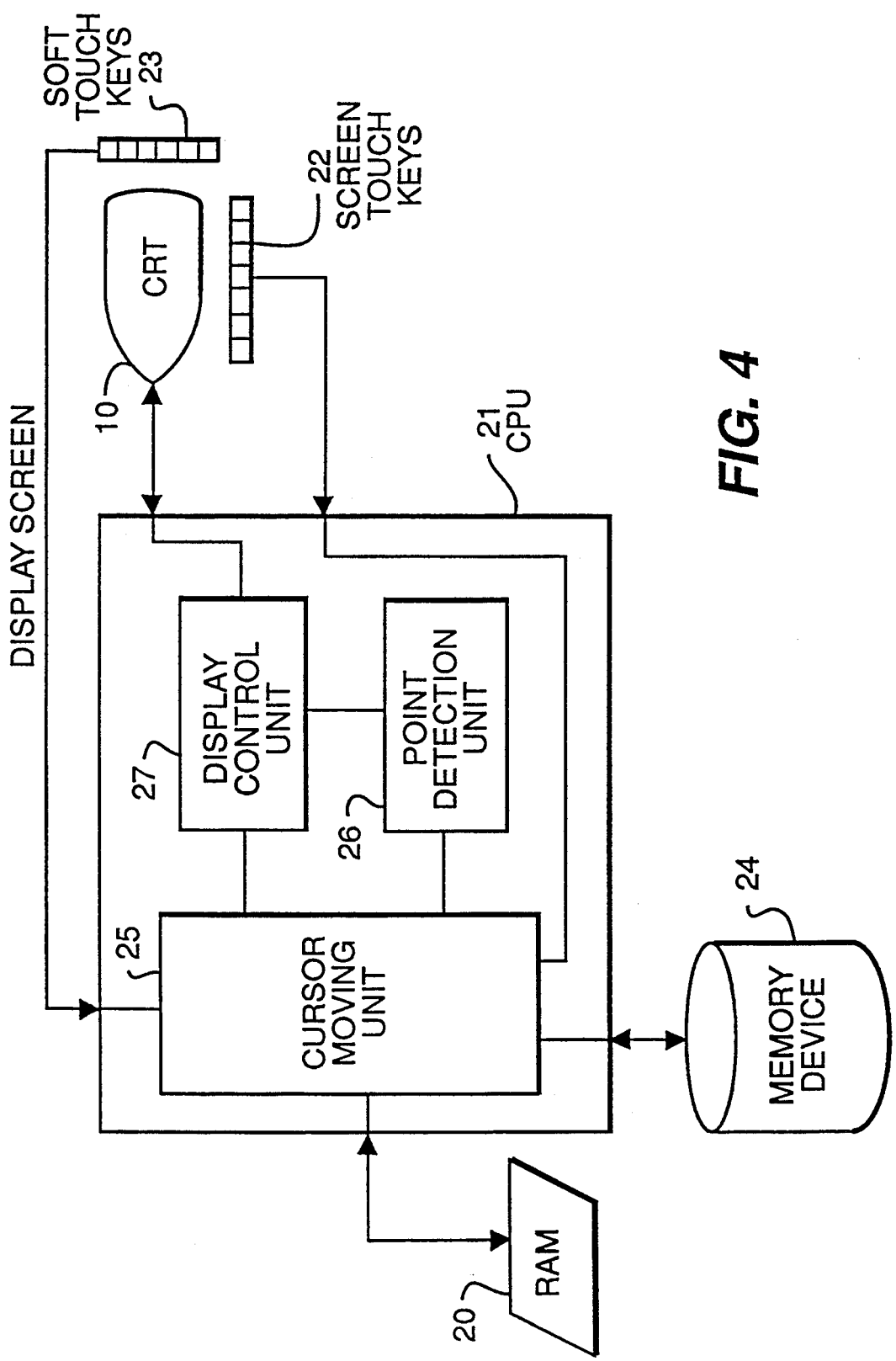
FIG. 4 is a block diagram illustrating the hardware of the embodiment shown in FIG. 3.

FIG. 4 shows the overall structure of this embodiment. In this embodiment, data collected at and sent from the monitoring area is sequentially stored in RAM 20. CPU 21 performs processes on the basis of the flow chart shown in FIG. 5. If there is input from touch area 13, enlargement key 16, graph reduction screen touch key 17 or other of the screen touch keys 22 or soft touch keys 23 such as fine adjustment cursor movement key 14, the necessary data are invoked from RAM 20 and display control program(s), which are stored in a memory device 24, such as hard disc or other external supplementary memory device, are read. The CRT display screen 10 is controlled on the basis of the commands from this program.

Describing in more detail the construction and operations of CPU 21, CPU 21 includes a cursor moving unit 25, a point detection unit 26 and a display control unit 27. Cursor moving unit 25 moves a cursorline to a specified point based on the input from touch area 13 and fine adjustment cursor movement key 14, point detection unit 26 detects a point of intersection that the cursorline intersects a displayed trendgraph. Display control unit 27 controls the display of the trendgraph based on a given display scale and a given alteration direction (axis X or Y) of the trendgraph.

Figure 5:
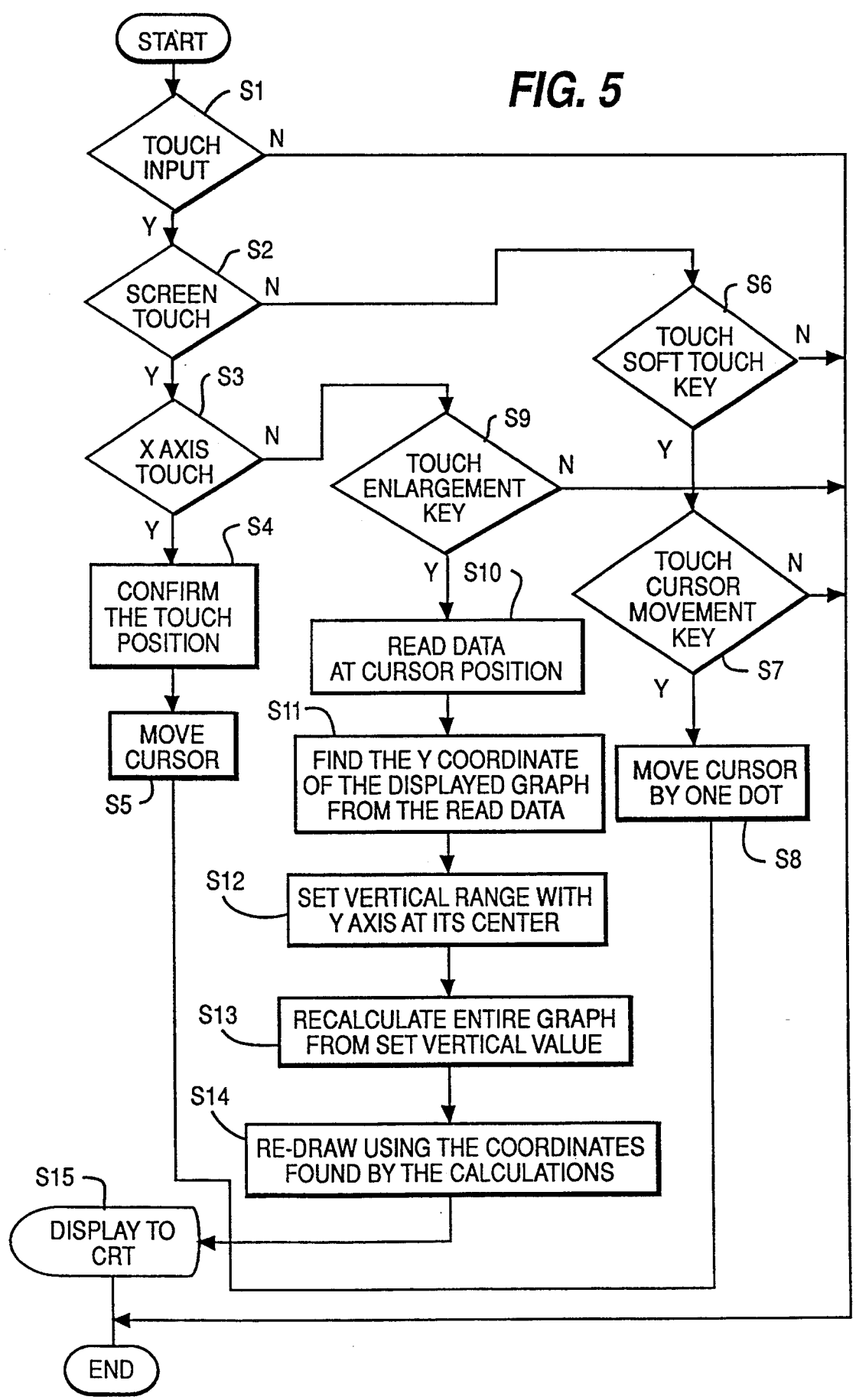
FIG. 5 is a flow chart illustrating an enlarged trendgraph display processes.

Next, the operations of the embodiment of the invention are explained with reference to FIG. 5. First, the operator displays the trend graph of the desired monitoring period using the operator's keyboard etc. When a part of this trend graph is to be displayed in enlarged form, the X coordinate of touch area 13 corresponding to the position on the X axis of this part is touched. In this embodiment of the invention, the area of the trend graph at point B is to be displayed in enlarged form. For CPU 21 there is input from screen touch key 22 or soft touch key 23 (step S1). When this input occurs, a decision is made as to whether this is input from screen touch key 22 or soft touch key 23 (step S2) and processing is halted if there is no touch input. In this embodiment, this is started at a fixed time intervals: for example, it might check whether there has been a touch key input every second and proceed to the next process if there is such an input and end processing if there is no such input. If a judgement is made at step S2 that there is input from screen touch key 22, a decision is made as to whether this is from touch area 13 (step S3). If the input is from touch area 13, the destination for cursor 12 is set to be the touch zone which contains the X position coordinate detected by the touch sensor (step S4) and cursor 12 is moved to this touch zone (step 5). As is shown in FIG. 4, cursor 12 is moved automatically to the touched position in touch area 13 by these processes. Also, the data from the part of the trend graph at point B are displayed in data display area 18.

Fine adjustment cursor movement key 14 is touched when it is desired to move cursor 12 within the same touch zone. That is, for CPU 21, it is decided by the process at step S2 that this is not an input from screen touch key 22 and at the next process, step S6, it is decided whether this is input from soft touch key 23 (step S6). If it is not input from soft touch key 23, processing is ended but if it is input from soft touch key 23, it is decided whether it is input from fine adjustment cursor movement key 14 (step S7). If it is input from fine adjustment cursor movement key the cursor 12 is moved one dot along axis X (step S8). In this embodiment of the invention, it is assumed that there is no movement of cursor 12 by fine adjustment cursor movement key 14.

Thus, after cursor 12 is moved to desired position B on the trend graph, the operator touches enlargement key 16 to display the trendgraph in enlarged form.

Figure 6:
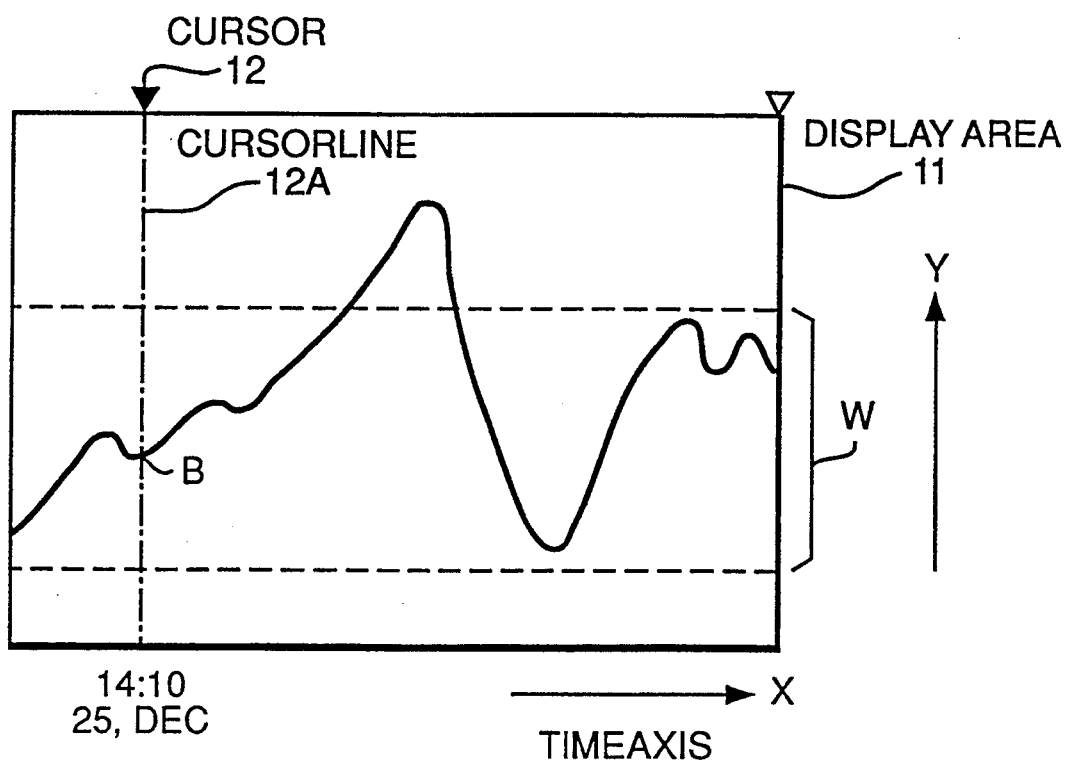
FIGS. 6 and 7 are views illustrating enlarged trendgraphs displayed by a trendgraph display system according to the invention.
Figure 7:
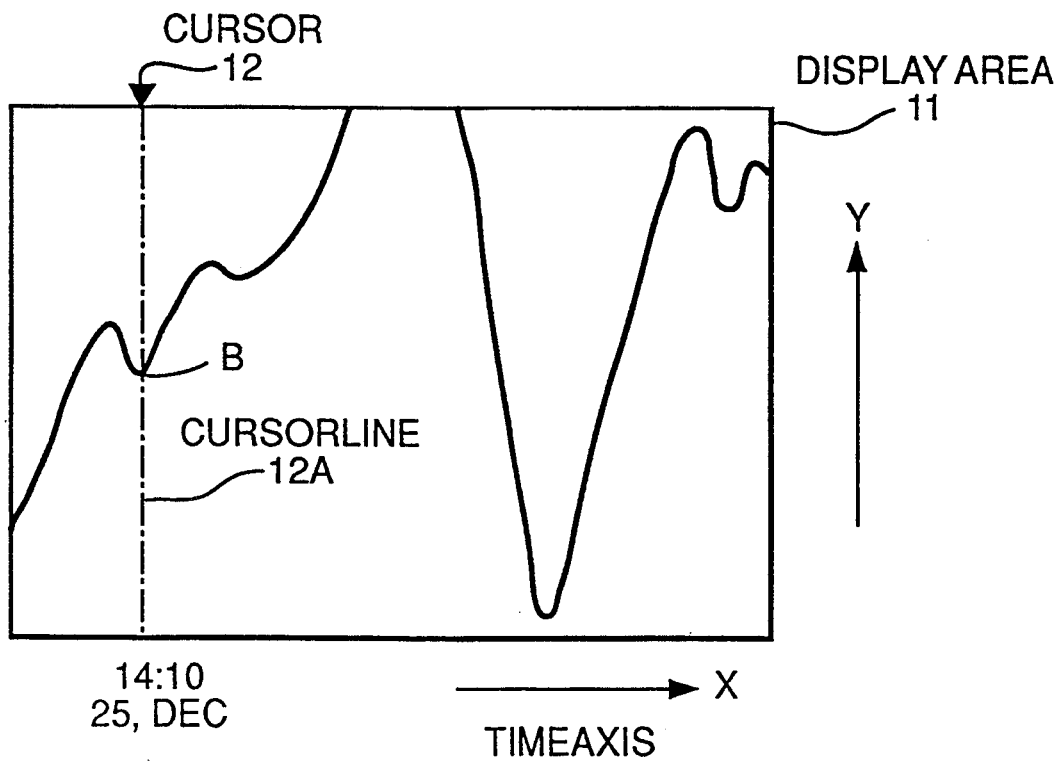

For CPU 21, if it is decided by the process at step S3 that the input from screen touch key 22 is not from touch area 13, it is next decided if the input is enlarged display input from enlargment key 16 (step S9). If it is not enlarged display input, processing is halted. If it is enlarged display input, the X coordinate of cursor 12 is read (step S10) and then the Y coordinate is found from the indicator line of the X coordinate and its point of intersection with the trend graph (step 11). Next the enlarged display range W of The Y axis with The Y axis of point of intersection B at its center is set on the basis of the degree of enlargment specified by the enlargement specification input (step S12). The coordinates of the trend graph are calculated for when display range W is enlarged (step 13), and the trend graph is re-drawn on the basis of the coordinates thus calculated (step 14) and display area W is displayed in enlarged form in display area 11 of the CRT (step S15). As a result of this, as shown in FIGS. 6 and 7, the area to be enlarged is displayed in an enlarged form with the Y axis of the point of intersection B at the center of display area 11.

In this embodiment, by touching the touch area 13 provided along the X axis of display area 11, it is possible to move cursor 12 instantly to the touched position and it is also possible to adjust the position of the cursor by units of one dot by the fine adjustment cursor movement key. Thus it is possible to specify the desired part of the trend graph instantaneously and also to specify this position more precisely.

Also, enlarged display range W along axis Y with point B, the point of intersection of the indicator line of the coordinate specified by cursor 12 with the trend graph, at its centre, is set and this enlarged display range W is displayed in enlarged form in display area 11. It is thus possible for the operator to display the area which is to be enlarged with intersection B at the center of the Y axis in display area 11.

Therefore, it is possible to move cursor 12 to the target position instantly and to enlarge the desired part of the trend graph in the center of the display area very easily. In comparison with the conventional devices, the operating characteristics are greatly improved.

As is described in detail above, in the embodiment of the invention it is possible to move the cursor to the target position on the trend graph instantly and display the desired part of the trend graph in enlarged form very simply. It thus provides a trend graph scale alteration device with much improved operating characteristics.

The above-described embodiment deals with the case where trendgraphs are displayed at a enlarged scale. In addition, trendgraphs can be displayed at a reduced scale in same way as the above enlarged case, using the same teachings.

What is claimed is:

1. A trendgraph display system for displaying a trendgraph with the X axis being the time axis, representing time-serially data collected at a specified period in a display area, the system comprising:

cursor means for displaying a cursorline corresponding to a desired time movable in the direction of the X axis in the display area;

touch sensor means provided near the display area for specifying by a touch a point on the X axis to which the cursorline is to be moved;

means for moving the cursorline to the specified point;

means for detecting a point of intersection where the cursorline intersects the displayed trendgraph in the display area;

means for selecting a display scale of the displayed trendgraph; and display control means for displaying the trendgraph at the selected display scale, the display control means automatically positioning in a vertical direction the point of intersection at the center of the display area at the selected display scale so, as to recognize a region including the point of intersection in the displayed trendgraph.

2. The trendgraph display system of claim 1, wherein the touch sensor means includes fine adjustment touch sensor means for moving the cursorline by smaller fixed units in the display area.

3. A method for displaying a trendgraph with the X axis being the time axis, representing time-serially data collected at a specified period at a display area, the method comprising the steps of:

displaying a cursorline movable in the direction of the X axis in the display area;

specifying by a touch a point on the X axis to which the cursorline is to be moved;

moving the cursorline to the specified point;

detecting a point of intersection where the cursorline intersects the displayed trendgraph in the display area;

selecting a display scale of the displayed trendgraph;

calculating the vertical displacement of the point of intersection from the center of the display area; and displaying the trendgraph with the point of intersection at the center of the display area based on the vertical displacement of the point of intersection at the selected display scale so as to recognize a region including the point of intersection in the displayed trendgraph.

4. The method for displaying a trendgraph of claim 3, wherein the step of specifying by a touch a point of the X axis includes the substep of moving the cursorline by fixed amount in the display area.

* * * * *